Feb. 2, 1971

J. R. AIREY

3,560,876

SUPERSONIC FLOW GASEOUS CHEMICAL LASER

Filed May 31, 1968

JOHN R. AIREY
INVENTOR.

BY Charles M. Hogan
Melvin E. Frederick

ATTORNEYS

United States Patent Office 3,560,876
Patented Feb. 2, 1971

3,560,876
SUPERSONIC FLOW GASEOUS
CHEMICAL LASER
John R. Airey, Woburn, Mass., assignor to Avco Corporation, Cincinnati, Ohio, a corporation of Delaware
Filed May 31, 1968, Ser. No. 733,714
Int. Cl. H01s 3/22
U.S. Cl. 331—94.5
6 Claims

ABSTRACT OF THE DISCLOSURE

A CW gaseous chemical laser wherein a plurality of suitable gases are expanded from a high pressure high temperature reservoir and mixed at supersonic velocities. Mixing and reaction take place in the supersonic flow to produce laser action.

---

Figure 1:
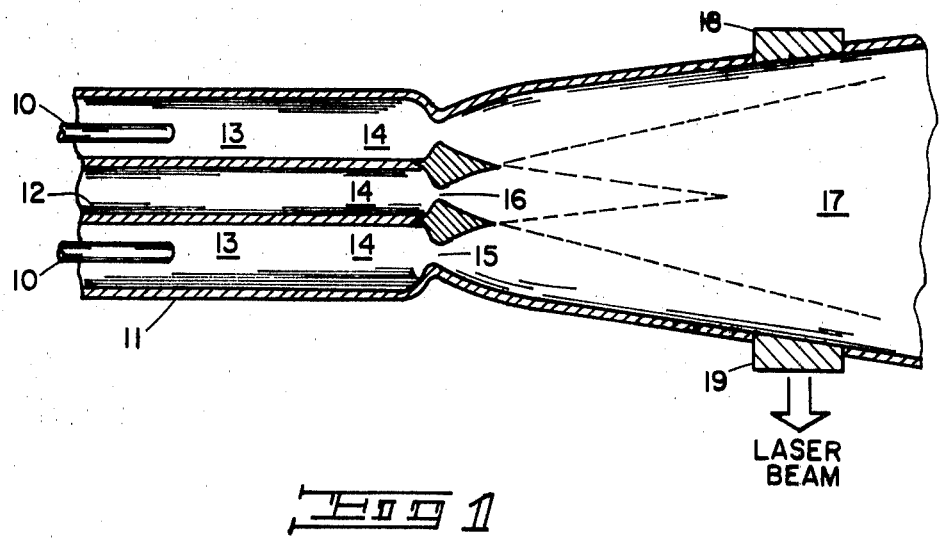

This invention relates to lasers and more particularly to gaseous chemical lasers wherein mixing and reaction take place in a supersonic flow.

Optical masers or lasers, as the art has developed, generally involve the establishment of an artificial distribution of bound electrons at energy levels other than the natural distribution in a host environment through the application of a source of energy known as the "pumping energy." This results in a greater number of molecules or atoms in some high energy level than in a lower energy level to which it is optically connected. This is known as a population inversion. The electrons present in the host environment in the artificial distribution then give up their energy and undergo a transition to the lower energy level. The released energy may be in the form of electromagnetic radiation; which, in the majority of devices seen thus far in the art, has been light, either in the visible or infrared.

In optical maser devices currently available in the art, there may be employed a gas, such as a helium-neon mixture; or, a crystal, such as chromium doped aluminum oxide; or a noncrystalline solid, such as neodymium glass; or a liquid, such as trivalent neodymium in selenium oxychloride, as the environment which responds to the pumping energy, permitting the population inversion of electrons between an excited state and a lower state. The electrons in returning to the lower state give off quanta of light energy or photons in what is known in the art as a radiative transition. When the density of these photons becomes large, the radiative transition probability increases; and, in the presence of a population inversion, electromagnetic modes into which the photons are emitted, in turn, become most readily able to induce further emission therein. This is known in the art as stimulated emission of radiation and results in a narrowing of the emission line. In the currently available optical maser devices, electrical power is converted to optical power, pumping light or an electrical discharge or electric current; which, in turn, is used to establish the population inversion.

The recent development of coherent light amplifiers and generators, now generally referred to as "optical masers" or "lasers" has made feasible a host of new uses and applications of electromagnetic wave energy in the optical portion of the spectrum. Light waves produced or amplified by such devices can be very sharply focused to produce energy densities suitable for welding, cutting, drilling and similar purposes. Furthermore, the high degree of monochromaticity obtainable from an optical maser makes it a useful tool for spectroscopic investigations as well as for stimulating various types of chemical and physical reactions. Among the most promising applications of coherent light amplifiers and generators are those in the field of communications where the optical spectrum represents virtually unlimited bandwidth and information carrying capacity. In addition, the directionality of optical maser beams greatly mitigates many problems of interference and security of communications channels.

For communications and other applications it is advantageous to have optical masers operable at many different wavelengths in the light spectrum, which is deemed to include infrared, visible and ultraviolet energy. As the wavelength emitted by any particular energy transition in a laser medium is tunable only over a small portion of the spectrum, it is important to provide a number of materials adapted for use as active laser media at various light frequencies. A great amount of research has recently been directed to the discovery of such materials and a number have been found. Furthermore, especially for communications use, it is important that laser media be provided which are adapted to continuous wave operation. In general, such media are those characterized by three or more energy levels, at least two of which are optically connected. A further communications requirement is low noise, a feature which, due to the complex structure and emission characteristics of solids, appears more readily achievable with gaseous optical masers.

High gain in a gas laser makes possible the realization of a useful optical amplifier which is merely the laser without any mirrors. When an external light beam passes through the active mixture of an optical amplifier, atoms or molecules in the proper excited state are stimulated to emit, thereby increasing the photon flux. In such a device, the wavelength of the incident light which is to be amplified must be precisely matched to that which results from the stimulated emission process; for example, a helium-xenon amplifier is specific for an amplification of 2.03 micron radiation and a carbon dioxide amplifier is specific for the amplification of 10.6 micron radiation. Optical amplifiers are useful for part of a practical laser communications system.

The following references and materials cited therein describe some of the background and physical principles involved in the devices under discussion and an insight, to some degree, of application of those principles in the present state of the art:

(1) Shuler, K. E., Carrington, T., and Light, J. C., "Nonequilibrium Chemical Excitation and Chemical Pumping of Lasers, Applied Optics Supplement on Chemical Lasers" (1965).

(2) Airey, J. R., and Wilson, J., "Chemical Reaction to Electromagnetic Wave Conversion Study," Technical Report No. RADC–TR–67–223 (1967).

(3) Airey, J. R., "A New Pulsed I–R Chemical Laser," IEEE J. Quantum Elect. 3, 208 (1967).

It is an object of the present invention to provide laser apparatus utilizing a novel method of producing a population inversion.

Another object of the invention is a provision of a flowing gas laser which is at continuous power levels heretofore not possible.

It is a still further object of the invention to provide a CW chemical laser.

Another object of the invention is to provide a CW chemical laser based on a reaction in which a high fraction of the exothermicity appears in vibration.

A still further object of the invention is to provide a CW chemical laser which does not require an auxiliary power source.

Figure 2:
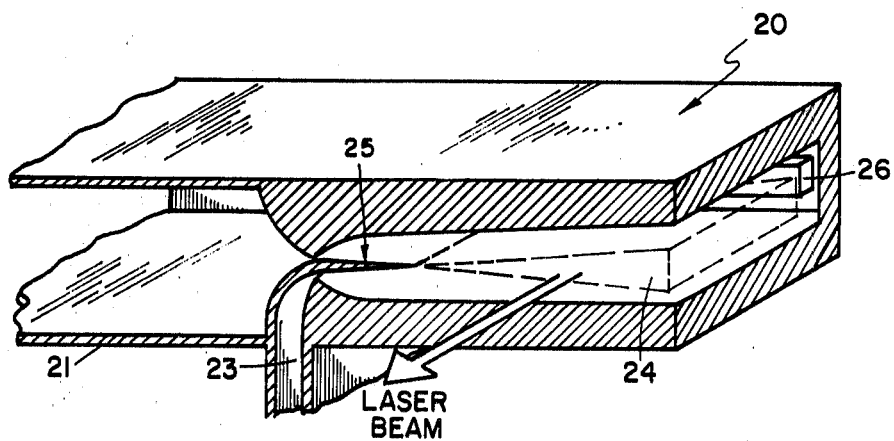

The novel features that are considered characteristic of the invention are set forth in the appended claims; the invention itself, however, both as to its organization and method of operation, together with additional objects and advantages thereof, will best be understood from the following description of the specific embodiment when read in conjunction with the accompanying drawings, in which:

FIG. 1 is a schematic cross sectional view of one kind of laser system in accordance with the invention; and FIG. 2 is a schematic cross sectional diagram of another kind of laser in accordance with the invention.

The CW system shown in FIG. 1 does not require an auxiliary power source as for pumping and the like.

The practical realization of a CW chemical laser, with or without a power source, has not been accomplished to date. As used herein, the term "Chemical Laser" means a laser where the inversion is produced directly by a chemical reaction. The production of a steady state inversion by chemical reaction has been reported (see K. G. Anlauf et al., Physics Letters, 24A, p. 208 (1967)) but at a pressure so low that CW laser oscillation could not be sustained.

A CW chemical laser in accordance with the present invention involves, inter alia, the use of flow to supply fresh reagents and remove waste material from the laser region. In the preferred embodiment disclosed hereinbelow, supersonic flow is utilized to provide selective control of the most important parameters of a laser system, i.e., the temperatures of the various degrees of freedom of the active components. This is particularly important in systems of the type here concerned which are believed to rely on a partial inversion for their operation.

When a suitable gas is expanded in accordance with the invention from a high pressure high temperature reservoir to supersonic velocities, an appreciable fraction of the thermal energy of the molecules is converted into directed kinetic energy. This is expressed by the equation $$C_p T_o = C_p T + \frac{V^2}{2}$$

where $C_p$ is specific heat, $T$ is the gas temperature, $T_o$ is the reservoir temperature and $V$ is the velocity. Thus, by expansion to supersonic velocities the gas temperature is reduced to a value considerably below the stagnation temperature. Moreover, provision of a properly designed flow geometry eliminates the necessity of an increase in temperature in the presence of an exothermic chemical reaction: the energy liberated by the reaction may be converted into directed kinetic energy. Accordingly, in a supersonic chemical laser of the type here concerned, the flow is designed such that the rotational and translational temperatures are kept low. This is beneficial in two ways: (a) since the translational and rotational degrees of freedom are closely coupled, by controlling the flow, the ratio $T_v/T_r$ (where $T_v$ is vibrational temperature and $T_r$ is rotational temperature) is to some degree controllable and (b) a low translational temperature is necessary to keep vibrational deactivation processes at a minimum. Subsonic flow lacks this control capability. The general reaction $$X + HY \rightarrow HX^* + Y$$

where X is a reactant halogen atom, HY is a reactant hydrogen halide molecule, HX is the excited product hydrogen halide, and Y is the product halogen atom, requires an atomic reagent which may be generated photolytically, thermally, or electrically from the stable molecule, $X_2$. Having produced a continuous source of atomic reagent, it is allowed to mix supersonically with the molecular reagent in a controlled flow region. In general, a CW chemical laser system requires a continuous energy source to produce the atomic reagent. However, the preferred embodiment involves the reaction $$F + HCl \rightarrow HF^* + Cl$$

which does not require an auxiliary power supply. This is because the molecular reagent HCl is the product of a simple flame reaction, $H_2 + Cl_2 \rightarrow 2HCl + 45$ kcal./mole.

The energy of formation of HCl is used to dissociate the $F_2$ since $$F_2 \rightarrow 2F \quad \Delta H = 37 \text{ kcal./mole}$$

and $$H_2 + Cl_2 \rightarrow 2HCl \quad \Delta H = -45 \text{ kcal./mole}$$

To date the power levels of practically realized chemical lasers have been far below their thermodynamic power limits. A pulsed $H_2:Cl_2$ and $CS_2:O_2$ system produces power levels of only 10–50 watts and ~0.5 watts respectively. These power levels corresponded to an efficiency of $\leq 0.01\%$ of the thermodynamic limit for these systems and neither of these systems is efficient in channeling reaction energy into product vibrational energy. The primary requirement for an efficient (i.e., high-power) chemical laser is a reaction in which a high fraction of the exothermicity appears in vibration. In accordance with the invention, the following set of reactions is contemplated:

(1) $Cl + HI \rightarrow HCl + I \quad -\Delta H = 32$ kcal./mole
(2) $Cl + HBr \rightarrow HCl + Br \quad -\Delta H = 16$ kcal./mole
(3) $Br + HI \rightarrow HBr + I \quad -\Delta H = 16$ kcal./mole
(4) $F + HCl \rightarrow HF + Cl \quad -\Delta H = 32$ kcal./mole
(5) $F + HBr \rightarrow HF + Br \quad -\Delta H = 47$ kcal./mole
(6) $F + HI \rightarrow HF + I \quad -\Delta H = 63$ kcal./mole A device for production of laser action in accordance with the invention is shown schematically in FIG. 1. Hydrogen is supplied from a suitable source to a plurality of pipes 10 and chlorine from a suitable source is supplied to pipe 11. Pipe 11 contains pipe 12 which receives fluorine from a suitable source. The hydrogen and chlorine from pipes 10 and 11 are combined in combustion region 13 just downstream of the ends of pipes 10 and burned to form hot hydrogen chloride. The hot hydrogen chloride comes into thermal equilibrium in a stagnation region 14 through heat exchange through the wall of pipe 12 with the flow of fluorine in pipe 12. Additional heat exchanger means may be provided if desired to provide the aforementioned thermal equilibrium. By way of example, for equimolar flows of reagents at a stagnation pressure of one atmosphere, the equilibrium conditions are $T=1270°$ K., HCl undissociated, $F:F_2=0.54:0.23$. The hot flow of hydrogen chloride and fluorine are expanded through their respective nozzles 15 and 16 to supersonic velocities and, hence, low temperatures and mixed in a lasing region 17 of controlled temperature and density. If desired, either of the gases may be diluted with an inert gas for temperature control.

Thus, as shown in FIG. 1, hydrogen, chlorine and fluorine may be introduced at room temperature into the laser at its input end, the hydrogen and chlorine mix and burn in the combustion or flame region, thermal equilibrium of the hydrogen chloride and fluorine resulting from the combustion occur in the stagnation region upstream of the nozzles, the fluorine atom concentration is frozen in a nozzle which provides a velocity of at least about Mach 1 and finally, mixing and reaction takes place downstream of the nozzles in supersonic flow to produce a lasing region therein. Mirrors 18 and 19 define an optical cavity.

The fluorine atom concentration is frozen in the rapid expansion through nozzle 16, i.e., the ratio $F:F_2$ remains at the stagnation value. In the mixing or lasing region downstream of the nozzles, the reaction $$F + HCl \rightarrow HF^* + Cl$$

and lasing action takes place between the vibration-rotation states of HF. Based on the assumption that it is possible to get 20% of the chemical energy out as laser power, a throat area of 15 cm.² and a stagnation pressure of one atmosphere, the device may be expected to provide a power level of 25 kw. Further, a flow rate of one pound/second of reagents may be expected to produce $10^5$ watts CW power.

Directing attention now to FIG. 2, there is shown apparatus in accordance with another embodiment of the invention comprising a supersonic mixing member generally designated by the number 20 coupled to the outlet of a rectangular tube 21 adapted to supply the atomic reagent. For experimental purposes, the tube 21 may be a shock tube which in accordance with the conventional for the atomic reagent such as, for example, $F_2$ or Br procedures produces well defined stagnation conditions for the halogen reactions. For CW operation, the reagent supplied via tube 21 may as previously discussed be provided via conventional photolytical, thermal or electrical means. The molecular reagent, such as, for example, HCl, HBr, or Hl is supplied from a room temperature reservoir to the supersonic mixing member 20 via pipe 23. The atomic reagent, partially dissociated, is supplied to the inlet of the supersonic mixing member 20 simultaneously with the molecular reagent and these reagents mix in the mixing region 24 downstream of the splitter plate 25. Mirrors 26 defining an optical cavity (only one mirror is shown in FIG. 2) are disposed on opposite sides of the mixing region 24 and in conventional manner produce an output laser beam. The laser emission occurs across the width of the mixing region.

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from the spirit and scope of the invention as defined by the following claims.

I claim:
1. In a laser, the combination comprising:
   (a) means forming a chamber having a first gas inlet for receiving an atomic gas, a second gas inlet for receiving a molecular gas, an outlet for exhausting said gases and a mixing region intermediate said inlets and said outlet;
   (b) means for supplying said atomic and molecular gases to said gas inlets, said gases upon mixing providing an exothermic bimolecular reaction in which a substantial portion of the exothermicity appears in vibration; and
   (c) means intermediate said gas inlets and said mixing region for expanding said gases into said mixing region at supersonic velocities.

2. In a laser, the combination comprising:
   (a) means forming a chamber having a first gas inlet for receiving an atomic gas, a second gas inlet for receiving a molecular gas, an outlet for exhausting said gases and a mixing region intermediate said inlets and said outlet, said gases upon mixing providing an exothermic bimolecular reaction in which a substantial portion of the exothermicity appears in vibration;
   (b) means for supplying said atomic gas partially dissociated to said first gas inlet;
   (c) means for supplying said molecular gas to said second gas inlet, said means for supplying said gases to said inlets providing high temperature thermal equilibrium in said gases near said gas inlets; and
   (d) means intermediate said gas inlets and said mixing region for expanding said gases into said mixing region at supersonic velocities.

3. The combination as defined in claim 2 wherein said molecular gas is a reagent resulting from the mixture and flame reaction of hydrogen and chlorine.

4. The combination as defined in claim 3 where said atomic gas is fluorine.

5. The combination as defined in claim 4 wherein the flow of said atomic gas and said molecular gas into said chamber is substantial in equimolar proportions.

6. The combination as defined in claim 5 wherein said means for supplying said molecular gas to said second gas inlet is in heat exchanging relationship with said means for supplying said atomic gas to said first gas inlet to substantially maintain said gases, in said thermal equilibrium.

References Cited

Cool, T. A., "A Fluid Mixing Laser," 9 Applied Physics Letters 12, Dec. 15, 1966, pp. 418–420.

RICHARD A. FARLEY, Primary Examiner

W. T. RIFKIN, Assistant Examiner

PO-1050
(5/69)

UNITED STATES PATENT OFFICE
CERTIFICATE OF CORRECTION

Patent No. 3,560,876      Dated February 2, 1971

Inventor(s) John R. Airey

It is certified that error appears in the above-identified patent and that said Letters Patent are hereby corrected as shown below:

Column 4, line 44, for "their respective" read ---respectively---; Column 5, line 6, after "conventional" read---procedures produces well defined stagnation conditions---; and Column 5, line 8, omit "procedures produces well defined stagnation conditions".

Signed and sealed this 22nd day of June 1971.

(SEAL)
Attest:

EDWARD M. FLETCHER, JR.      WILLIAM E. SCHUYLER, JR.
Attesting Officer      Commissioner of Patents